US012341263B2

(12) United States Patent
Chang et al.

(10) Patent No.: US 12,341,263 B2
(45) Date of Patent: Jun. 24, 2025

(54) DUAL-FREQUENCY ANTENNA

(71) Applicant: LUXSHARE PRECISION INDUSTRY COMPANY LIMITED, Baoan Shenzhen (CN)

(72) Inventors: Yao-Yuan Chang, Baoan Shenzhen (CN); Wei-Hsin Chen, Baoan Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 155 days.

(21) Appl. No.: 18/369,551

(22) Filed: Sep. 18, 2023

(65) Prior Publication Data

US 2024/0387994 A1 Nov. 21, 2024

(30) Foreign Application Priority Data

May 17, 2023 (CN) ......................... 202310559434.4

(51) Int. Cl.
*H01Q 5/40* (2015.01)
*H01Q 1/38* (2006.01)
*H01Q 1/50* (2006.01)

(52) U.S. Cl.
CPC ................. *H01Q 5/40* (2015.01); *H01Q 1/38* (2013.01); *H01Q 1/50* (2013.01)

(58) Field of Classification Search
CPC .. H01Q 5/40; H01Q 1/38; H01Q 1/50; H01Q 1/24; H01Q 5/307
See application file for complete search history.

(56) References Cited

U.S. PATENT DOCUMENTS 10,249,939 B2 * 4/2019 Chen ........................ H01Q 1/48
2009/0058759 A1 * 3/2009 Morikawa ............... H01P 5/085 343/906

(Continued)

FOREIGN PATENT DOCUMENTS

CN 108306104 A 7/2018
TW 523177 U 3/2003

(Continued)

OTHER PUBLICATIONS

Malik et al., “A Compact Dual-Band Antenna With Omnidirectional Radiation Pattern”, IEEE Antennas and Wireless Propagation Letters, 2015, vol. 14, pp. 503-506.

(Continued)

*Primary Examiner* — Seung H Lee
(74) *Attorney, Agent, or Firm* — Birch, Stewart, Kolasch & Birch, LLP

(57) ABSTRACT

Disclosed is a dual-frequency antenna including a dielectric carrier plate, a first radiator, a second radiator, a coupling radiator and a coaxial cable. The first radiator, the second radiator and the coupling radiator are disposed on a first surface of the dielectric carrier plate, and the coupling radiator is located between the first radiator and the second radiator and is spaced apart from the first radiator and the second radiator respectively. The coaxial cable includes an inner conductor, a first insulating layer covering part of the inner conductor, an outer conductor covering part of the first insulating layer, and a second insulating layer covering part of the outer conductor. The exposed inner conductor is electrically connected to the first radiator. The exposed outer conductor is electrically connected to the second radiator. Therefore, the dual-frequency antenna generates a first resonance mode and a second resonance mode with different center frequencies.

12 Claims, 11 Drawing Sheets

(56) References Cited

U.S. PATENT DOCUMENTS

2018/0138595 A1* 5/2018 Nysen .................... H01Q 1/38
2022/0037767 A1* 2/2022 Yun .................... H01Q 1/2291

FOREIGN PATENT DOCUMENTS

TW 200638598 A 11/2006
TW 201216564 A1 4/2012
TW 201530903 A 8/2015

OTHER PUBLICATIONS

Wu et al., "Dual-band omni-directional antenna for WLAN application", Microwave and Optical Technology Letters, May 2008, vol. 50, No. 5, pp. 1328-1330, doi10.1002mop.23376.
Zhang et al., "Compact omnidirectional dual-band dipole antenna with reduced ground plane effect", Microwave and Optical Technology Letters, 2021, vol. 63, No. 6, pp. 1753-1759, doi10.1002/mop.32817.

* cited by examiner

DUAL-FREQUENCY ANTENNA

CROSS REFERENCE TO RELATED PRESENT DISCLOSURE

This application claims the priority benefit of Chinese Patent Application Serial Number 202310559434.4, filed on May 17, 2023, the full disclosure of which is incorporated herein by reference.

BACKGROUND

Technical Field

The present disclosure relates to the technical field of wireless communication, in particular to a dual-frequency antenna.

Related Art

The antenna used to send and receive radio frequency signals is one of the most important components in a wireless communication device. In order to obtain better communication quality, the wireless communication device usually adopts a dipole antenna with the good antenna characteristic and an omnidirectional radiation pattern.

With the rapid development of radio frequency technology, the dipole antenna disposed in the wireless communication device needs to support multi-frequency applications. In order to have the dual-frequency operation characteristic, the structural design of most dipole antennas is usually relatively complicated, which results in the fact that the radiation pattern of the dipole antenna cannot achieve a good omnidirectional effect, or the overall size of the dipole antenna is large, which does not meet the development requirements of light, thin, short, and small for the wireless communication device.

Therefore, how to provide a miniaturized dual-frequency antenna with an omnidirectional radiation pattern is a problem that those skilled in the art need to solve.

SUMMARY

Embodiments of the present disclosure provide a dual-frequency antenna, which can solve the problem that the existing dipole antenna with the dual-frequency operation characteristic cannot have a good omnidirectional radiation pattern or have larger overall size due to its complex structural design.

In order to solve the above-mentioned technical problems, the present disclosure is implemented as follows:

The present disclosure provides a dual-frequency antenna including a dielectric carrier plate, a first radiator, a second radiator, a coupling radiator and a coaxial cable. The dielectric carrier plate includes a first surface; the first radiator, the second radiator and the coupling radiator are disposed on the first surface; the coupling radiator is located between the first radiator and the second radiator, and the coupling radiator is spaced apart from the first radiator and the second radiator respectively on the first surface. The coaxial cable includes an inner conductor, a first insulating layer, an outer conductor and a second insulating layer. The first insulating layer covers a part of a surface of the inner conductor to make one end of the inner conductor exposed, and the inner conductor, which is exposed, is electrically connected to the first radiation. The outer conductor covers a part of a surface of the first insulating layer. The second insulating layer covers a part of a surface of the outer conductor to make a portion of the outer conductor exposed, and the outer conductor, which is exposed, is electrically connected to the second radiator. The inner conductor is electrically connected to the first radiator, and the outer conductor is electrically connected to the second radiator, so that the first radiator and the second radiator generate a first resonance mode, and the coupling radiator is coupled with the first radiator and the second radiator respectively to generate a second resonance mode, wherein a center frequency of the second resonance mode is greater than a center frequency of the first resonance mode.

In the dual-frequency antenna of the embodiment of the present disclosure, the first radiator, the second radiator and the coupling radiator are spaced apart on the first surface of the dielectric carrier plate, the coupling radiator is located between the first radiator and the second radiator, the inner conductor of the coaxial cable is electrically connected to the first radiator, and the outer conductor of the coaxial cable is electrically connected to the second radiator, so that the first radiator and the second radiator generate the first resonance mode, the coupling radiator is coupled with the first radiator and the second radiator respectively and generates a second resonance mode different from the first resonance mode. Therefore, the dual-frequency antenna of the embodiment of the present disclosure can achieve the omnidirectional radiation characteristic and meet the requirements of dual-frequency communication while reducing the overall size, and has a simple structure and the characteristic of easy processing, and can be applied to different wireless communication devices.

BRIEF DESCRIPTION OF THE DRAWINGS

Accompanying drawings described herein are intended to provide a further understanding of the present disclosure and form a part of the present disclosure, and exemplary embodiments of the present disclosure and descriptions thereof are intended to explain the present disclosure but are not intended to unduly limit the present disclosure. In the drawings.

DETAILED DESCRIPTION OF THE EMBODIMENTS

The embodiments of the present disclosure will be described below in conjunction with the relevant drawings. In the figures, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as "directly connected" or "directly coupled" to another element, there is no intervening element therebetween.

In addition, although the terms such as "first", "second", etc., are used herein to describe different elements or operations, these terms are only used to distinguish elements or operations described with the same technical terms.

Besides, for convenience of description, spatially relative terms such as "below", "under", "above", "over", etc., may be used herein to describe the relationship between one element or feature and another (one or more) element(s) or feature(s) as shown in the figures.

Figure 1:
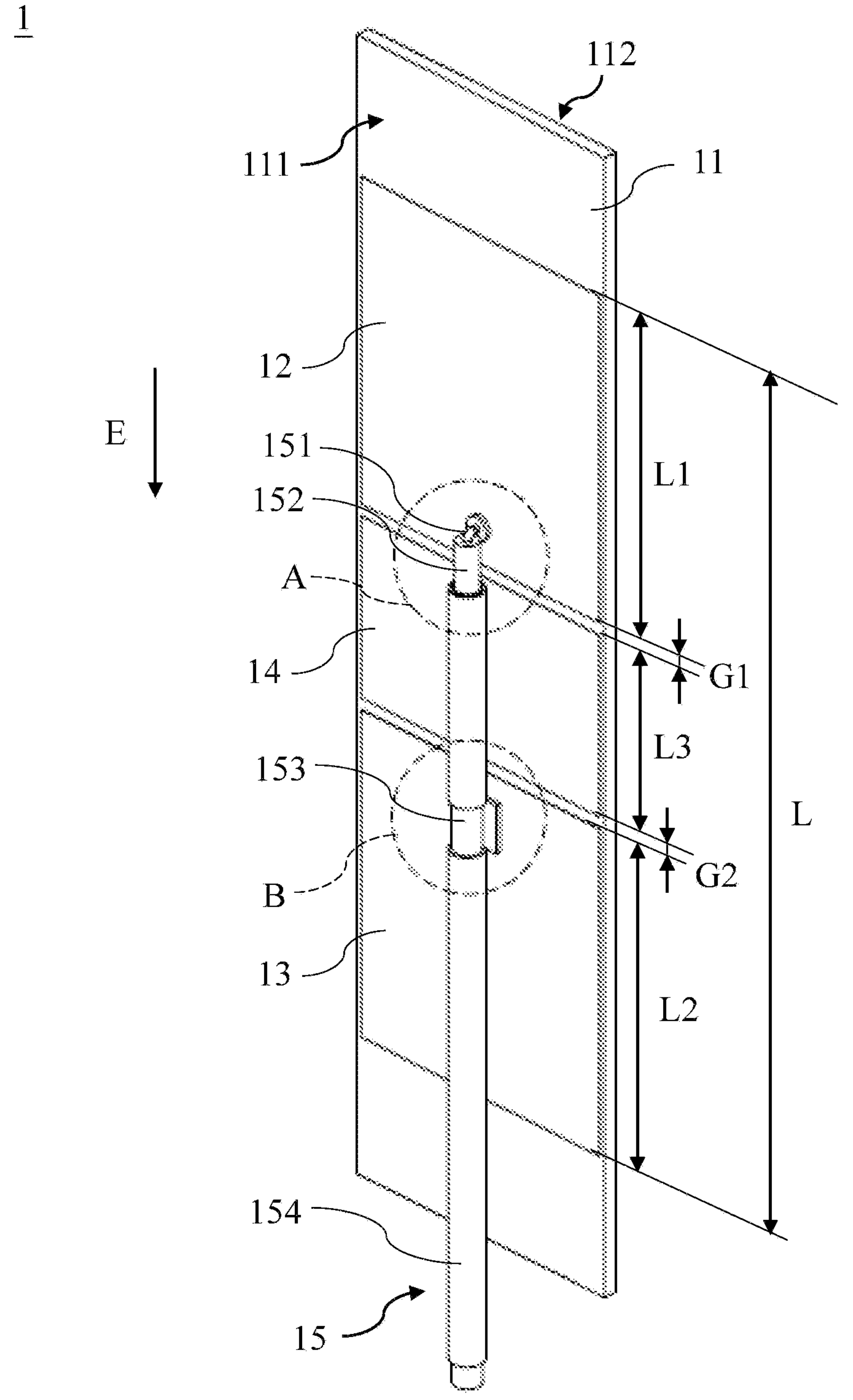
FIG. 1 is a perspective view of a dual-frequency antenna according to an embodiment of the present disclosure.
Figure 2:
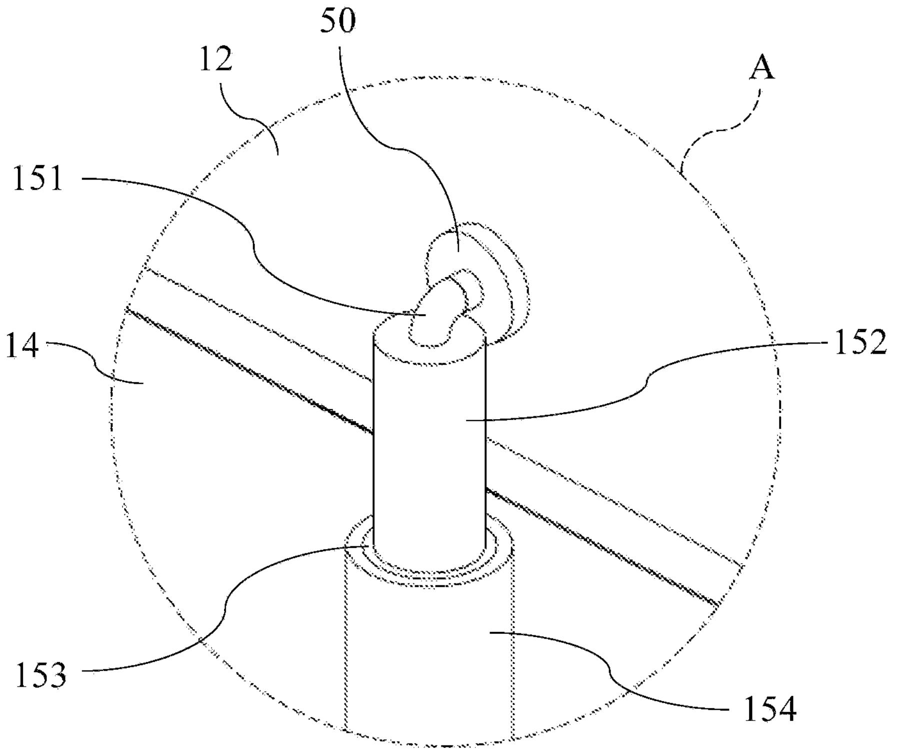
FIG. 2 is an enlarged schematic view of the region A in FIG. 1.
Figure 3:
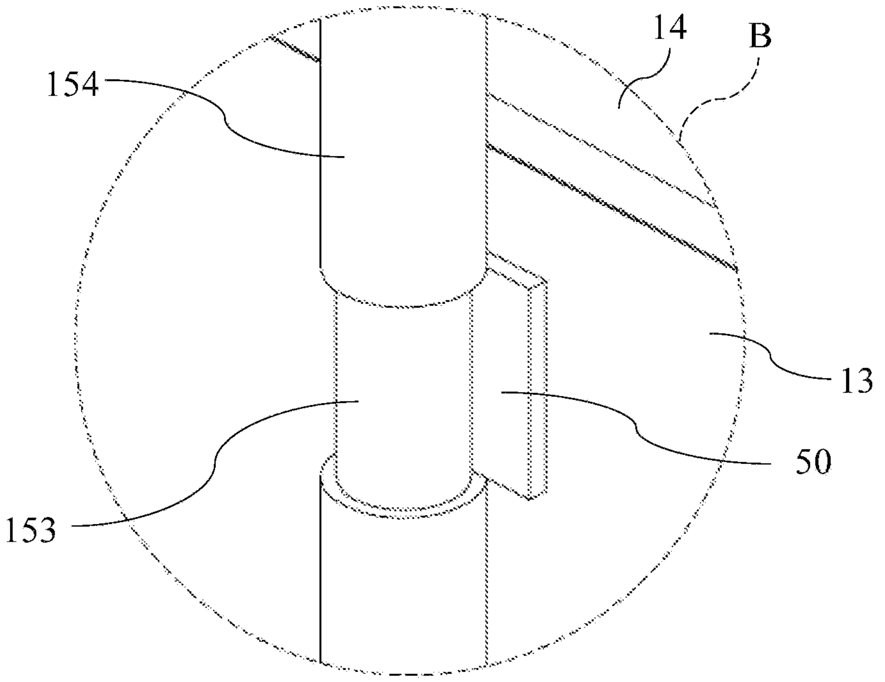
FIG. 3 is an enlarged schematic view of the region B in FIG. 1.

Please refer to FIG. 1 to FIG. 3, wherein FIG. 1 is a perspective view of a dual-frequency antenna according to an embodiment of the present disclosure, FIG. 2 is an enlarged schematic view of the region A in FIG. 1, and FIG. 3 is an enlarged schematic view of the region B in FIG. 1. As shown in FIG. 1 to FIG. 3, a dual-frequency antenna 1 comprises a dielectric carrier plate 11, a first radiator 12, a second radiator 13, a coupling radiator 14 and a coaxial cable 15, wherein the dielectric carrier plate 11 can be, but not limited to, a flame retardant 4 (FR4) substrate, a printed circuit board (PCB), or a flexible printed circuit (FPC) board; the first radiator 12, the second radiator 13 and the coupling radiator 14 can all be made of metal materials, such as copper, silver, aluminum, iron, or alloys thereof.

In this embodiment, the dielectric carrier plate 11 comprises a first surface 111 and a second surface 112 opposite to each other. The first radiator 12, the second radiator 13 and the coupling radiator 14 are disposed on the first surface 111. The coupling radiator 14 is located between the first radiator 12 and the second radiator 13, and the coupling radiator 14 is spaced apart from the first radiator 12 and the second radiator 13 on the first surface 111. That is to say, the first radiator 12, the second radiator 13 and the coupling radiator 14 are disposed on the same surface of the dielectric carrier plate 11 (i.e., the first surface 111). Therefore, the dielectric carrier plate 11 can be but not limited to a single-sided board, thereby reducing the manufacturing cost of the dual-frequency antenna 1; meanwhile, the dual-frequency antenna 1 can be disposed in a wireless communication device by setting an adhesive layer on the second surface 112, and the adhesive layer does not affect the radiation characteristic of the dual-frequency antenna 1.

In this embodiment, the coupling radiator 14, the first radiator 12 and the second radiator 13 can be planar structures respectively. Specifically, the coupling radiator 14, the first radiator 12 and the second radiator 13 may respectively be rectangular planar structures disposed on the first surface 111, but this embodiment is not intended to limit the present disclosure. For example, the coupling radiator 14, the first radiator 12 and the second radiator 13 can be any geometric planar structures respectively arranged on the first surface 111; or, the coupling radiator 14, the first radiator 12 and/or the second radiator 13 can be three-dimensional structures respectively (that is, in addition to the planar structure disposed on the first surface 111, the coupling radiator 14, the first radiator 12 and/or the second radiator 13 can further comprise radiation branches extending away from the first surface 111).

The coupling radiator 14, the first radiator 12 and the second radiator 13 can be planar structures respectively, the first radiator 12, the second radiator 13 and the coupling radiator 14 are disposed on the same surface of the dielectric carrier plate 11, and the first radiator 12, the second radiator 13 and the coupling radiator 14 can all be made of metal materials, so that the coupling radiator 14, the first radiator 12 and the second radiator 13 can be disposed on the first surface 111 by patching or printing, and the processing is easy.

In this embodiment, the coaxial cable 15 comprises an inner conductor 151, a first insulating layer 152, an outer conductor 153 and a second insulating layer 154, wherein the first insulating layer 152 covers a part of the surface of the inner conductor 151 to make one end of the inner conductor 151 exposed, and the exposed inner conductor 151 is electrically connected to the first radiator 12; the outer conductor 153 covers a part of the surface of the first insulating layer 152; the second insulating layer 154 covers a part of the surface of the outer conductor 153 to make a portion of the outer conductor 153 exposed, and the exposed outer conductor 153 is electrically connected to the second radiator 13. The inner conductor 151 can be but not limited to a silver-plated copper conductor, the first insulating layer 152 can be but not limited to a polytetrafluoroethylene insulating layer, the outer conductor 153 can be but not limited to a silver-plated copper wrapping layer, and the second insulating layer 154 can be but not limited to a polyvinyl chloride insulating layer. The exposed outer conductor 153 and the exposed first insulating layer 152 can be separated by a distance. The exposed inner conductor 151 is electrically connected to the first radiator 12 by welding and the exposed outer conductor 153 is electrically connected to the second radiator 13 by welding (that is, the exposed inner conductor 151 is electrically connected to the first radiator 12 through the soldering metal 50, and the exposed outer conductor 153 is electrically connected to the second radiator 13 through the soldering metal 50).

In this embodiment, the inner conductor 151 is electrically connected to the first radiator 12, and the outer conductor 153 is electrically connected to the second radiator 13, so that the first radiator 12 and the second radiator 13 generate a first resonance mode (that is, the first radiator 12 and the second radiator 13 are excited by the coaxial cable 15 to generate the first resonance mode), the coupling radiator 14 is respectively coupled with the first radiator 12 and the second radiator 13 to generate a second resonance mode, and the center frequency of the second resonance mode is greater than the center frequency of the first resonance mode. The center frequency of the first resonance mode may be but not limited to 2.45 GHz, and the center frequency of the second resonance mode may be but not limited to 5.5 GHz (that is, the operation frequency band of the dual-frequency antenna 1 may be but not limited to limited to 2.45G frequency band and 5.5G frequency band). The first resonance mode can be a half-wavelength resonance mode (that is, a length L between the end of the first radiator 12 away from the coupling radiator 14 and the end of the second radiator 13 away from the coupling radiator 14 on the first surface 111 is one-half of the first wavelength). Since the inner conductor 151 of the coaxial cable 15 generate an inductance effect, the length L1 of the first radiator 12 on the first surface 111 and the length L2 of the second radiator 13 on the first surface 111 can be reduced.

Figure 4:
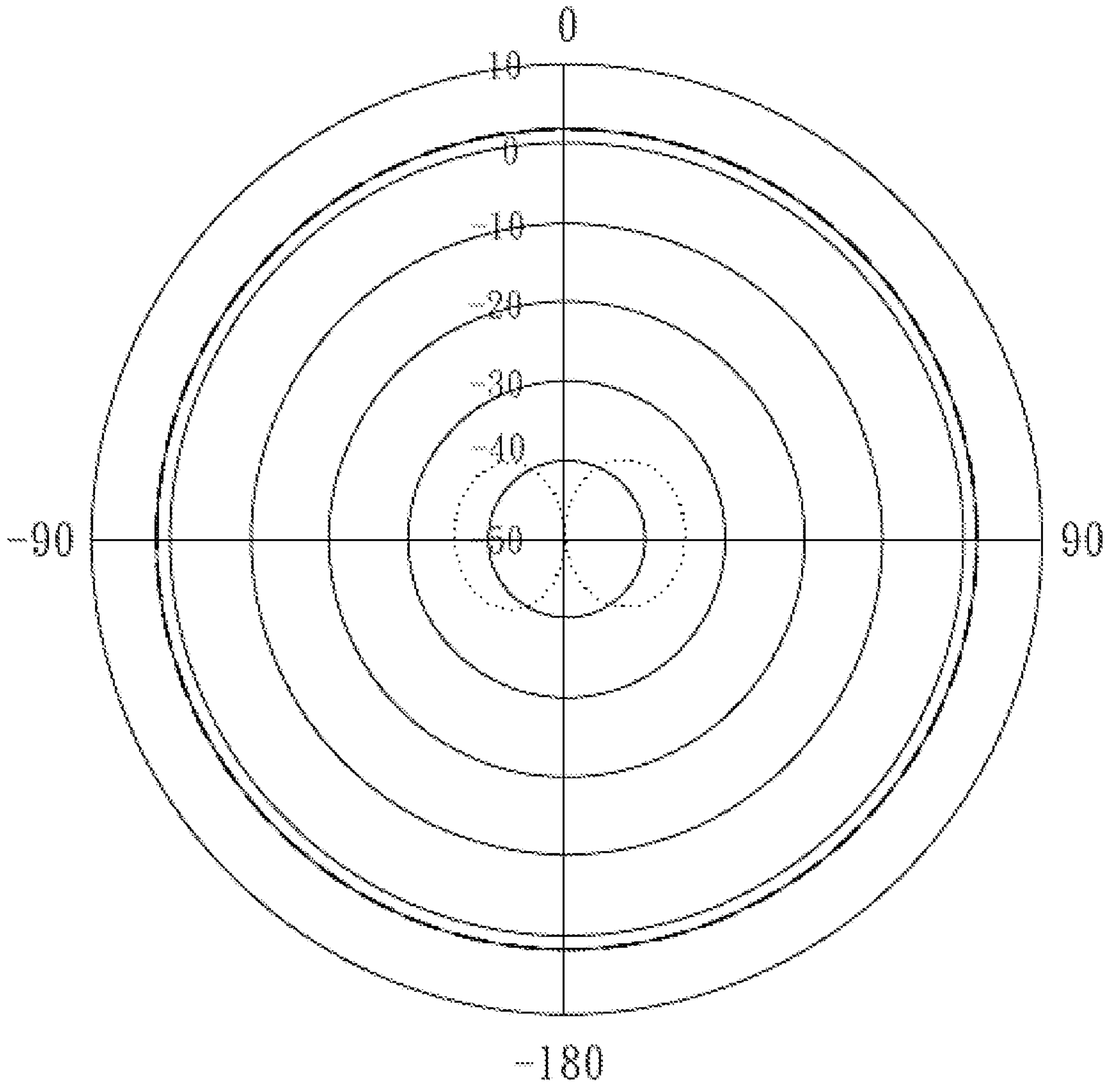
FIG. 4 is a radiation pattern diagram of a first resonance mode of the dual-frequency antenna of FIG. 1 on a XOY plane.
Figure 5:
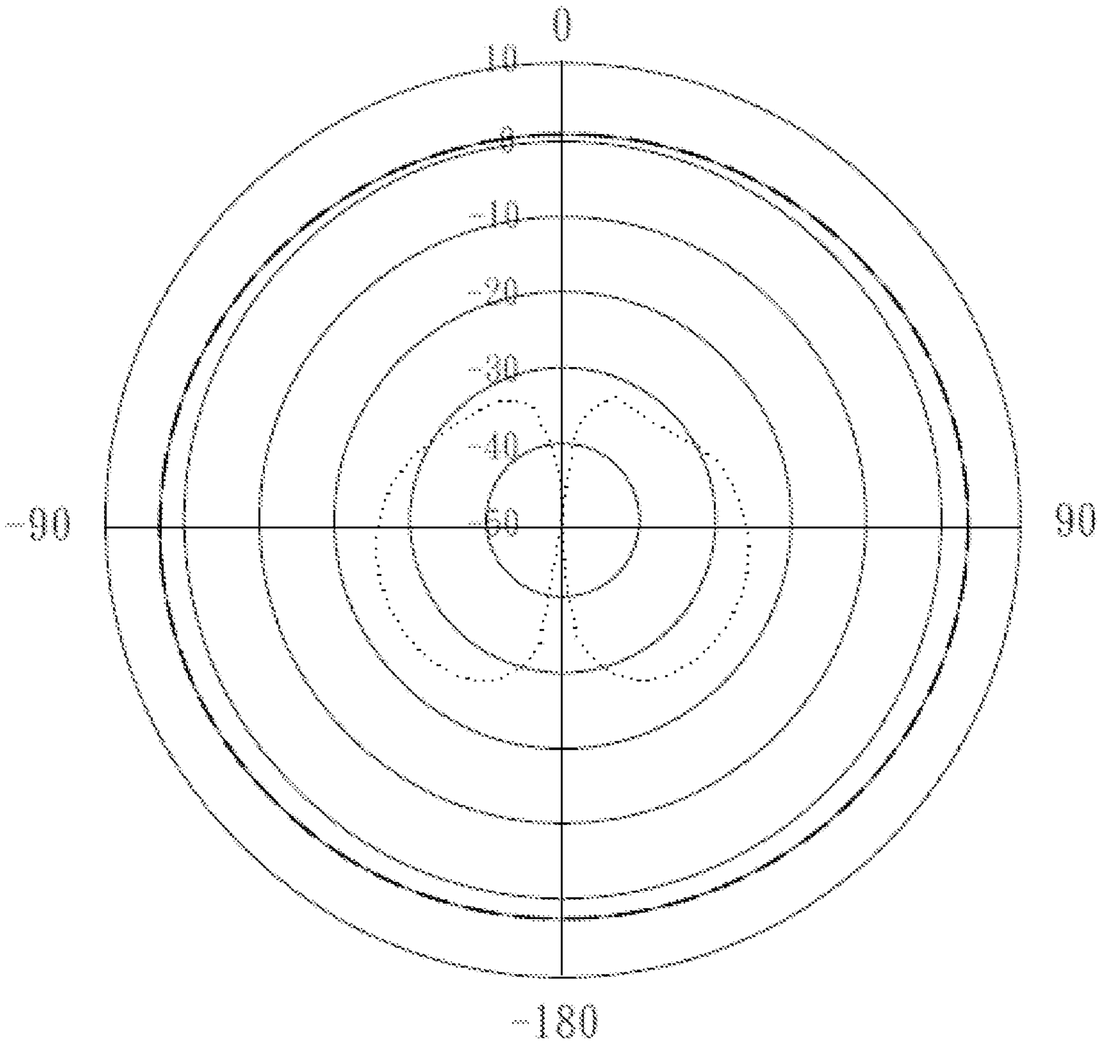
FIG. 5 is a radiation pattern diagram of a second resonance mode of the dual-frequency antenna of FIG. 1 on a XOY plane.

Please refer to FIG. 4 and FIG. 5, wherein FIG. 4 is a radiation pattern diagram of a first resonance mode of the dual-frequency antenna of FIG. 1 on a XOY plane, FIG. 5 is a radiation pattern diagram of a second resonance mode of the dual-frequency antenna of FIG. 1 on a XOY plane, the thick dotted line is the Theta polarization pattern (i.e., the vertically polarized radiation pattern), the thin dotted line is the Phi polarization pattern (i.e., the horizontally polarized radiation pattern), and the thin solid line is the total radiation pattern. As shown in FIG. 4 and FIG. 5, it can be clearly seen that the dual-frequency antenna 1 has a good vertical/horizontal polarization ratio and achieves the omnidirectional radiation characteristic (that is, the dual-frequency antenna 1 has good transceiver performance). The Theta polarization pattern is almost the same as the total radiation pattern.

Figure 6:
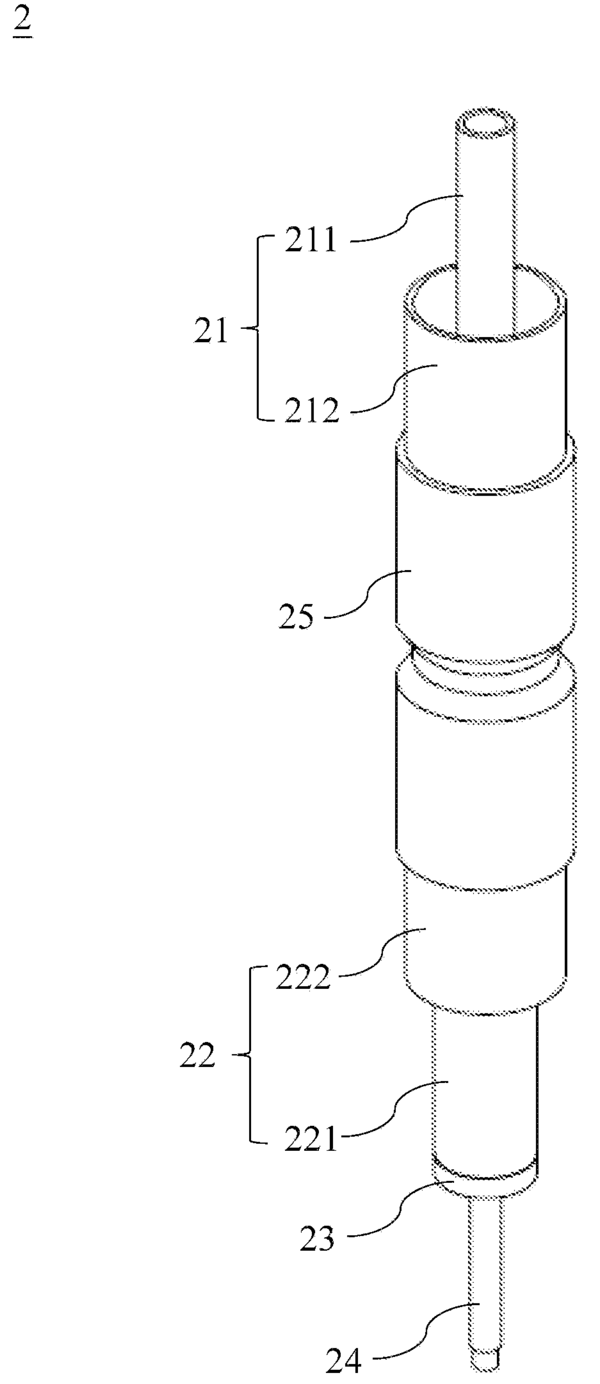
FIG. 6 (Prior Art)
FIG. 6 is a perspective view of an existing dipole antenna with dual-frequency operation.
Figure 7:
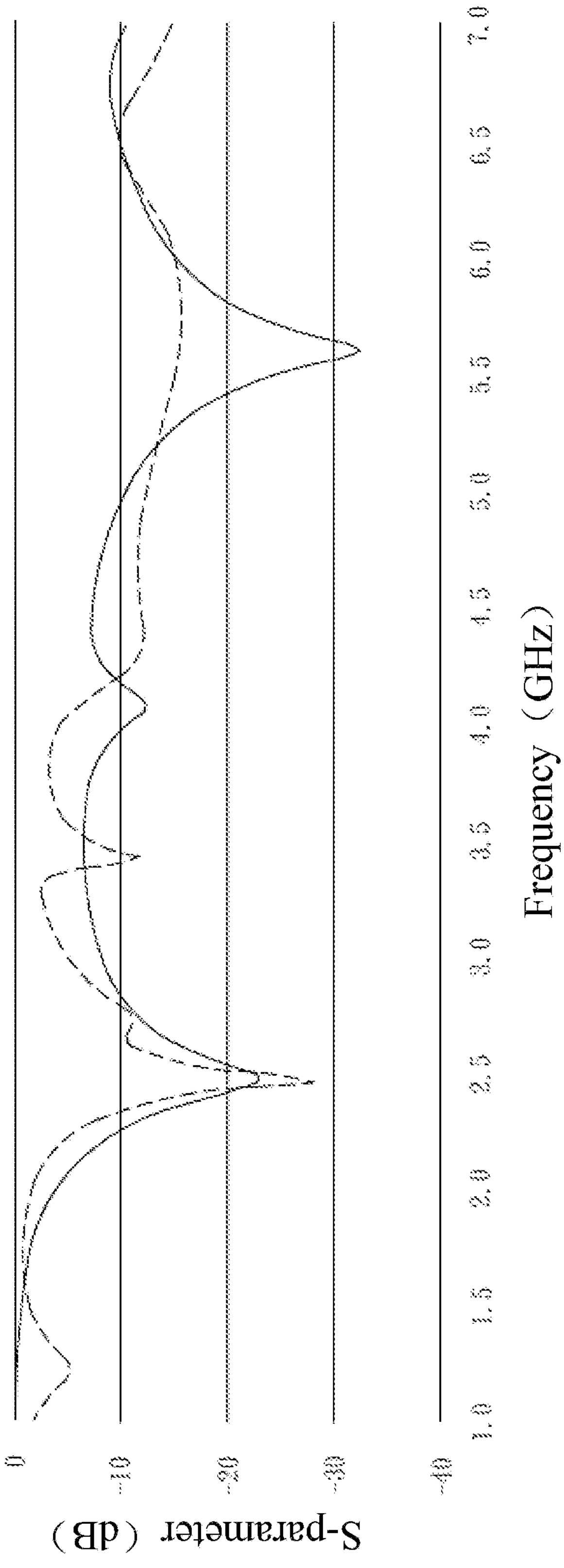
FIG. 7 is a graph illustrating S-parameters of the dual-frequency antenna of FIG. 1 and the dipole antenna of FIG. 6.
Figure 8:
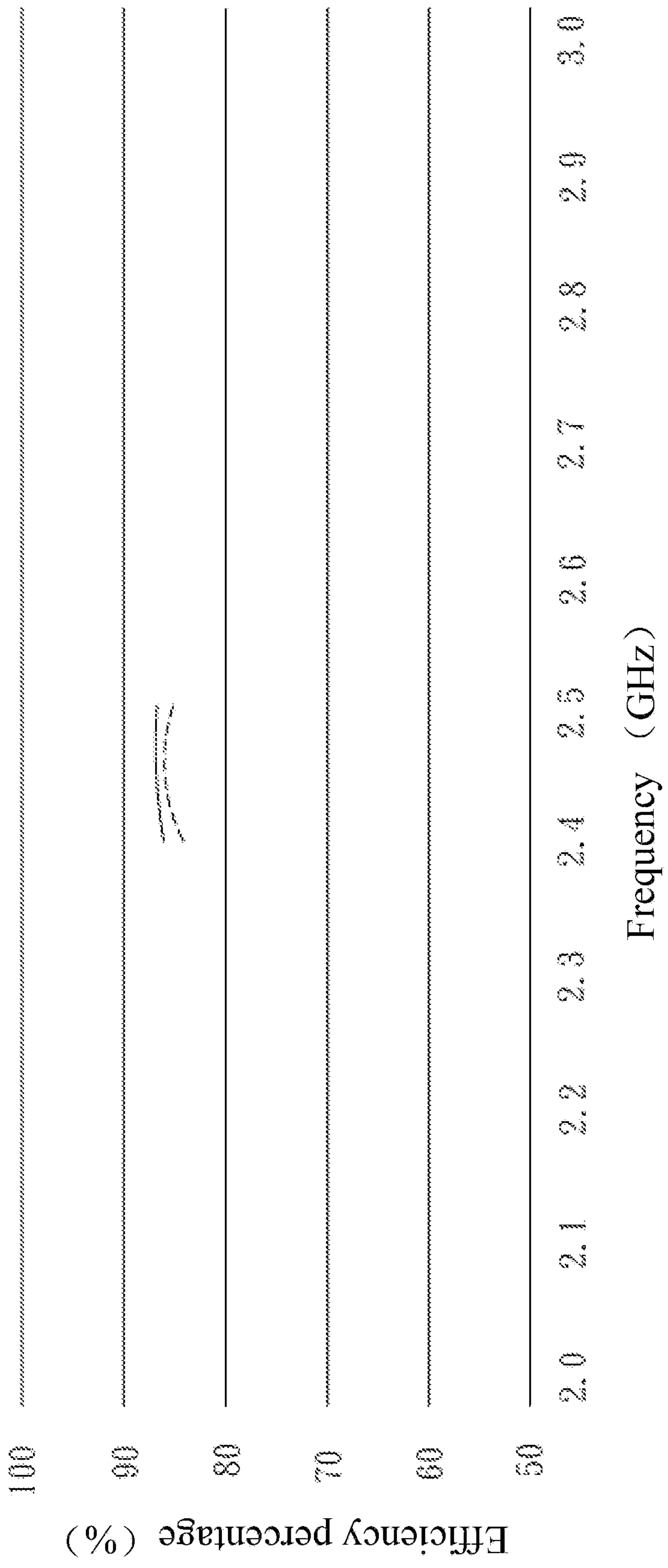
FIG. 8 is a diagram of antenna efficiency of the dual-frequency antenna of FIG. 1 and the dipole antenna of FIG. 6 operating in the 2.45G frequency band.
Figure 9:
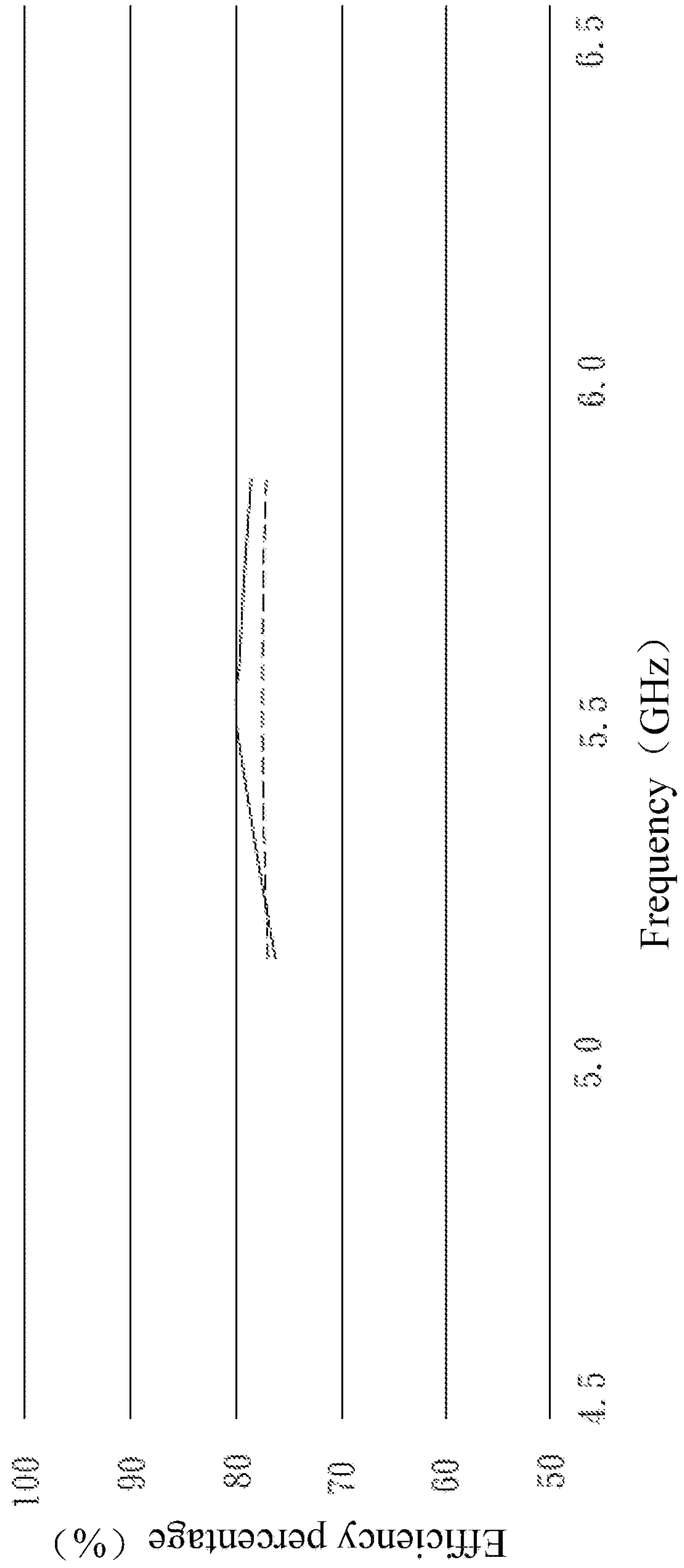
FIG. 9 is a diagram of antenna efficiency of the dual-frequency antenna of FIG. 1 and the dipole antenna of FIG. 6 operating in the 5.5 GHz frequency band.

Please refer to FIG. 1 and FIG. 6 to FIG. 9, wherein FIG. 6 is a perspective view of an existing dipole antenna with dual-frequency operation, FIG. 7 is a graph illustrating S-parameters of the dual-frequency antenna of FIG. 1 and the dipole antenna of FIG. 6, the horizontal axis represents the operation frequency with an unit of GHz, the vertical axis represents the S11 parameter with an unit of dB, the dotted line is the S-parameter curve of the dipole antenna of FIG. 6, and the solid line is the S-parameter curve of the dual-frequency antenna of FIG. 1; FIG. 8 is a diagram of antenna efficiency of the dual-frequency antenna of FIG. 1 and the dipole antenna of FIG. 6 operating in the 2.45G frequency band, FIG. 9 is a diagram of antenna efficiency of the dual-frequency antenna of FIG. 1 and the dipole antenna of FIG. 6 operating in the 5.5 GHz frequency band, the horizontal axis represents the operation frequency with an unit of GHz, the vertical axis represents the efficiency percentage with an unit of %, the dotted line is the antenna efficiency curve of the dipole antenna of FIG. 6, and the solid line is the antenna efficiency curve of the dual-frequency antenna of FIG. 1.

As shown in FIG. 6, a dipole antenna 2 comprises a first radiant tube 21 and the second radiant tube 22, a fixed ring 23, a coaxial cable 24 and a heat-shrinkable sleeve 25, wherein the coaxial cable 24 passes through the second radiant tube 22 and protrudes from the second radiant tube 22, the inner conductor of the coaxial cable 24 is electrically connected with the first radiant tube 21, and the outer conductor of the coaxial cable 24 is connected with the second radiant tube 21, so that a first radiant part 211 of the first radiant tube 21 and the second radiant part 221 of the second radiant tube 22 generate a low-frequency resonance mode (i.e., 2.45G frequency band), a third radiant part 212 of the first radiant tube 21 and a fourth radiant part 222 of the second radiant tube 22 generate a high-frequency resonance mode (i.e., 5.5G frequency band); the fixed ring 23 is used for fixedly connecting the coaxial cable 24 and the second radiant tube 22; the heat-shrinkable sleeve 25 is used for fixedly connecting the first radiant tube 21 and the second radiant tube 22 arranged at intervals, and preventing the electrical connection between the coaxial cable 24 and the second radiant tube 22 and the electrical connection between the coaxial cable 24 and the first radiant tube 21 from breaking. Therefore, the structural design of the existing dipole antenna 2 with the dual-frequency operation characteristic is more complicated than that of the dual-frequency antenna 1 of FIG. 1. In addition, the overall length of the dipole antenna 2 of FIG. 6 is 52 millimeters (mm), and the overall length of the dual-frequency antenna 1 of FIG. 1 is 35 mm, so that it can be seen that the overall length of the dipole antenna 2 is larger than the overall length of the dual-frequency antenna 1, and the length of the dual-frequency antenna 1 can be reduced by about 33% compared to the length of the dipole antenna 2. In some embodiments, the length of the dual-frequency antenna 1 can be reduced by 30% to 40% compared to the length of the existing dipole antenna 2 with the dual-frequency operation characteristic.

As shown in FIG. 7 to FIG. 9, it can be clearly seen that the dual-frequency antenna 1 and the dipole antenna 2 have similar antenna efficiencies in the 2.45G frequency band and the 5.5G frequency band, and that the dual-frequency antenna 1 has better dual-frequency operation characteristics compared to the dipole antenna 2.

It can be seen from the above that the dual-frequency antenna 1 can achieve the omnidirectional radiation characteristic and meet the requirements of dual-frequency communication while reducing the overall size compared to the dipole antenna 2, and has a simple structure and the characteristic of easy processing.

In one embodiment, the electrical connection between the inner conductor 151 and the first radiator 12 (i.e., the position of the soldering metal 50 in FIG. 2) and the electrical connection between the outer conductor 153 and the second radiator 13 (i.e., the position of the soldering metal 50 in FIG. 3) can be arranged at intervals along an extending direction E of the coaxial cable 15. Therefore, it facilitates the configuration of the coaxial cable 15.

In one embodiment, the central frequency of the first resonance mode can be adjusted by the length L between the end of the first radiator 12 away from the coupling radiator 14 and the end of the second radiator 13 away from the coupling radiator 14 on the first surface 111 (that is, the overall length of the dual-frequency antenna 1), and the center frequency of the second resonance mode can be adjusted by a size of a first gap G1 between the coupling radiator 14 and the first radiator 12 on the first surface 111 and a size of a second gap G2 between the coupling radiator 14 and the second radiator 13 on the first surface 111. Specifically, the first radiator 12 and the second radiator 13 can form a dipole antenna, and the operation frequency and center frequency of the first resonance mode can be adjusted by the length L; the first gap G1 and the second gap G2 can be used as two capacitors, and the operation frequency and center frequency of the second resonance mode can be adjusted by the size of the first gap G1 and the size of the second gap G2. That is to say, the operation frequency band of the dual-frequency antenna 1 (i.e., the frequency ratio of the operation frequency of the first resonance mode and the operation frequency of the second resonance mode) can be adjusted according to requirements, so that the dual-frequency antenna 1 can be applied to different wireless communications devices.

In one embodiment, the size of the first gap G1 between the coupling radiator 14 and the first radiator 12 on the first surface 111 can be equal to the second gap G2 between the coupling radiator 14 and the second radiator 13 on the first surface 111. In another embodiment, the size of the first gap G1 between the coupling radiator 14 and the first radiator 12 on the first surface 111 may be different from the size of the second gap G2 between the coupling radiator 14 and the second radiator 13 on the first surface 111. It should be noted that the size adjustments of the first gap G1 and the second gap G2 affect the impedance matching on the second resonance mode.

Figure 10:
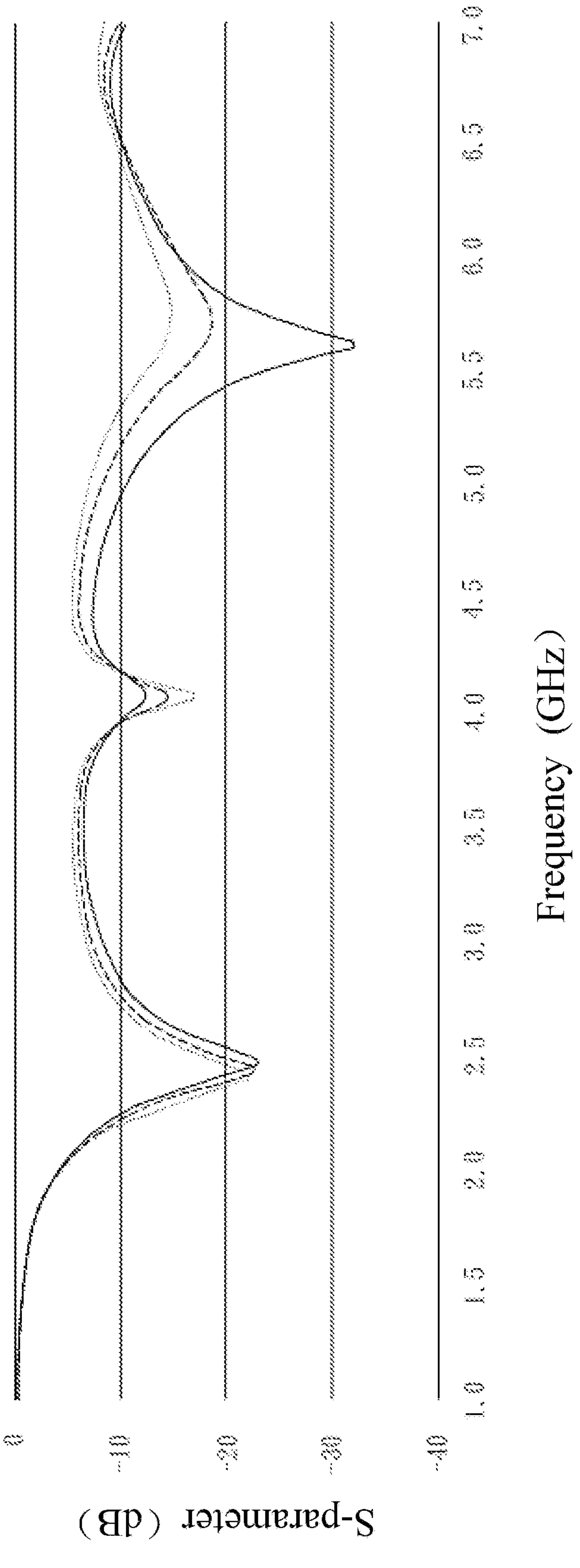
FIG. 10 is a graph illustrating S-parameters of the dual-frequency antenna of FIG. 1 with different first slots and second slots.

Please refer to FIG. 10, which is a graph illustrating S-parameters of the dual-frequency antenna of FIG. 1 with different first slots and second slots, wherein the size of the first gap G1 is equal to the size of the second gap G2, the solid line is the S-parameter curve when the first gap G1 is 0.5 mm, the thick dotted line is the S-parameter curve when the first gap G1 is 0.75 mm, and the thin dotted line is the S-parameter curve when the first gap G1 is 0.5 mm. As shown in FIG. 10, it can be clearly seen that the larger the first gap G1 between the coupling radiator 14 and the first radiator 12 on the first surface 111 (that is, the smaller the length L3 of the coupling radiator 14), the larger the central frequency of the second resonance mode.

Figure 11:
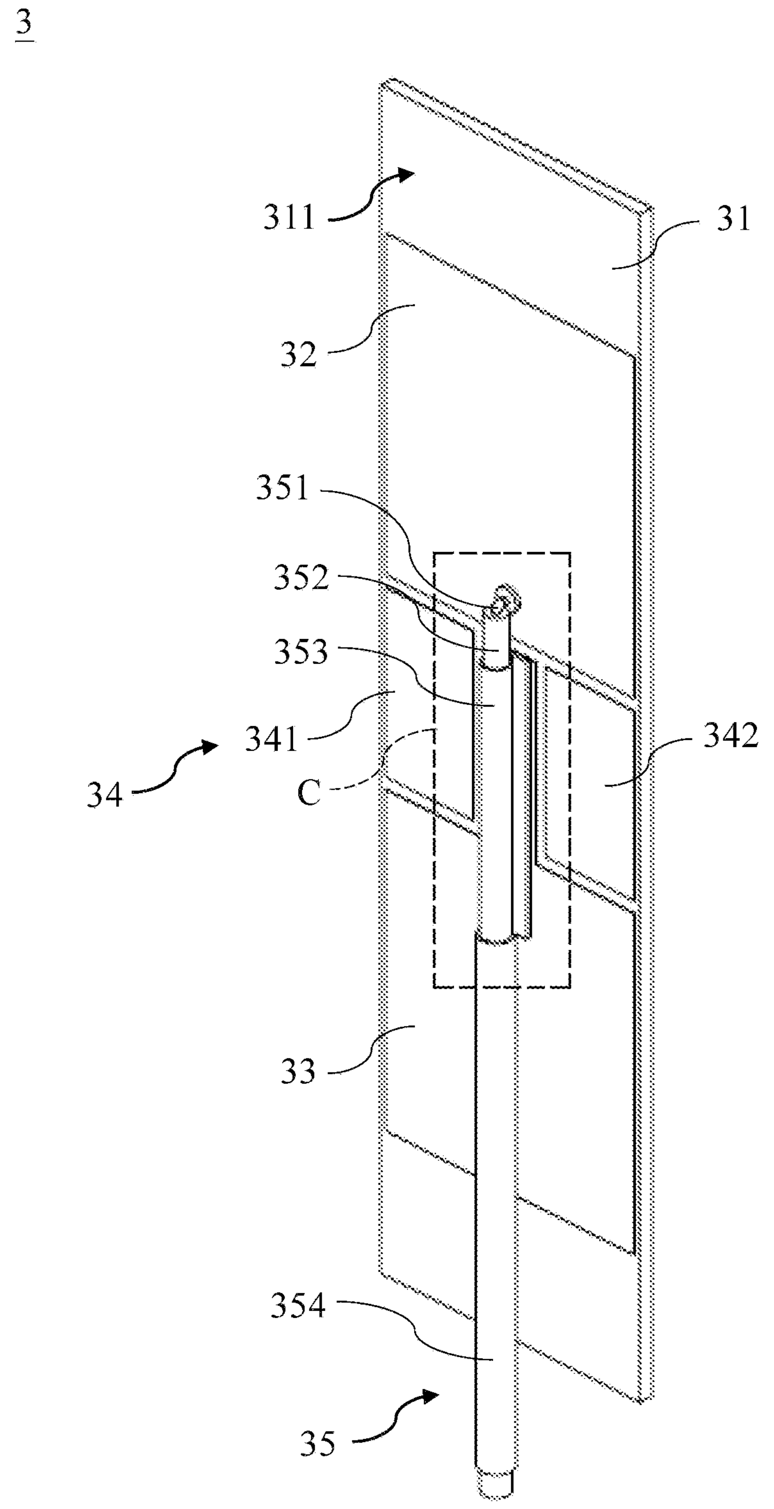
FIG. 11 is a perspective view of a dual-frequency antenna according to another embodiment of the present disclosure.
Figure 12:
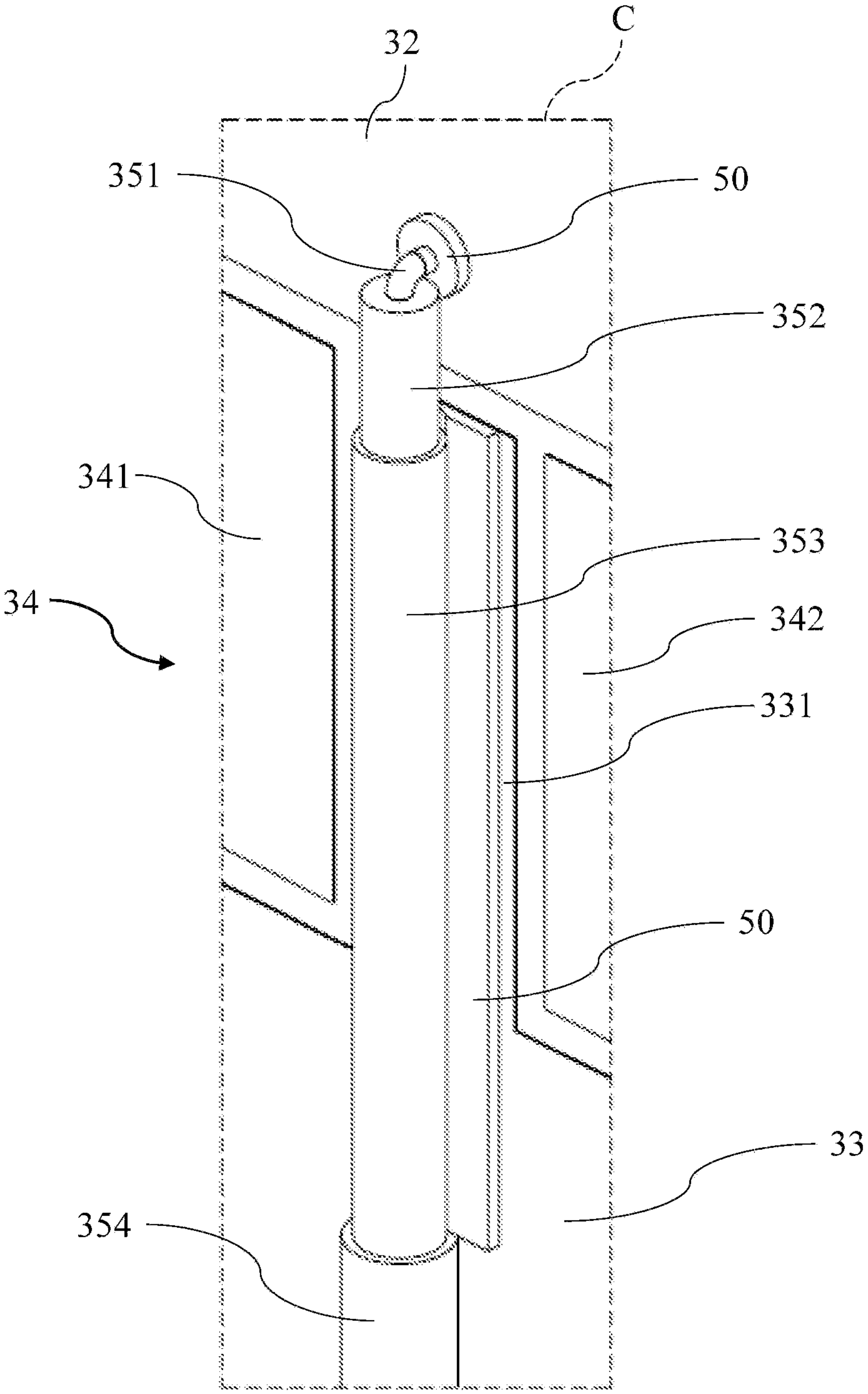
FIG. 12 is an enlarged schematic view of the region C in FIG. 11.

Please refer to FIG. 11 and FIG. 12, wherein FIG. 11 is a perspective view of a dual-frequency antenna according to another embodiment of the present disclosure, and FIG. 12 is an enlarged schematic view of the region C in FIG. 11. As shown in FIG. 11 and FIG. 12, a dual-frequency antenna 3 comprises a dielectric carrier plate 31, a first radiator 32, a second radiator 33, a coupling radiator 34 and a coaxial cable 35. The dielectric carrier plate 31 comprises a first surface 311; the first radiator 32, the second radiator 33 and the coupling radiator 34 are disposed on the first surface 311, the coupling radiator 34 is located between the first radiator 32 and the second radiator 33, and the coupling radiator 34 is spaced apart from the first radiator 32 and the second radiator 33 on the first surface 311 respectively.

In this embodiment, the second radiator 33 comprises an extension section 331 extending toward the first radiator 32, and the coupling radiator 34 comprises a first sub-radiator 341 and a second sub-radiator 342. The first sub-radiator 341 and the second sub-radiator 342 are disposed on the first surface 311, the extension section 331 is disposed between the first sub-radiator 341 and the second sub-radiator 342, and the extension section 331 is spaced apart from the first sub-radiator 341 and the second sub-radiator 342 respectively. The shape of the extension section 331 may be, but not limited to, a triangle, a rectangle or any geometric figure.

In this embodiment, the coaxial cable 35 comprises an inner conductor 351, a first insulating layer 352, an outer conductor 353 and a second insulating layer 354, and the first insulating layer 352 covers a part of the surface of the inner conductor 351 to make one end of the inner conductor 351 exposed, and the exposed inner conductor 351 is electrically connected to the first radiator 32; the outer conductor 353 covers a part of the surface of the first insulating layer 352; the second insulating layer 354 covers a part of the surface of the outer conductor 353 to make a portion of the outer conductor 353 exposed, and the exposed outer conductor 353 is electrically connected to the extension section 331 of the second radiator 33.

In this embodiment, the inner conductor 351 is electrically connected to the first radiator 32, and the outer conductor 353 is electrically connected to the extension section 331 of the second radiator 33, so that the first radiator 32 and the second radiator 33 generate a first resonance mode, the coupling radiator 34 is coupled with the first radiator 32 and the second radiator 33 respectively to generate a second resonance mode, and the center frequency of the second resonance mode is greater than the center frequency of the first resonance mode.

In one embodiment, the extension section 331 and the first radiator 32 are spaced apart from each other on the first surface 311, and the exposed outer conductor 353 is adjacent to the exposed first insulating layer 352. Specifically, the exposed outer conductor 153 of the coaxial cable 15 is separated from the exposed first insulating layer 152 by a distance in FIG. 1, which is not conducive to the processing of the coaxial cable 15, so by the design of the extension section 331 and the first radiator 32 spaced apart on the first surface 311, the exposed outer conductor 353 of the coaxial cable 35 is adjacent to the exposed first insulating layer 352 of the coaxial cable 35, thereby facilitating the processing and use of coaxial cable 35. The exposed inner conductor 351 can be electrically connected to the first radiator 32 by welding, and the exposed outer conductor 353 can be electrically connected to the extension section 331 of the second radiator 33 by welding (that is, the exposed inner conductor 351 is electrically connected to the first radiator 32 by the soldering metal 50, and the exposed outer conductor 353 is electrically connected to the extension section 331 of the second radiator 33 by the soldering metal 50).

In summary, in the dual-frequency antenna of the present disclosure, the first radiator, the second radiator and the coupling radiator are spaced apart on the first surface of the dielectric carrier plate, the coupling radiator is located between the first radiator and the second radiator, the inner conductor of the coaxial cable is electrically connected to the first radiator, and the outer conductor of the coaxial cable is electrically connected to the second radiator, so that the first radiator and the second radiator generate the first resonance mode, the coupling radiator is coupled with the first radiator and the second radiator respectively and generates a second resonance mode different from the first resonance mode. Therefore, the dual-frequency antenna of the present disclosure can achieve the omnidirectional radiation characteristic and meet the requirements of dual-frequency communication while reducing the overall size, and has a simple structure and the characteristic of easy processing, and can be applied to different wireless communication devices.

While the present disclosure is disclosed in the foregoing embodiments, it should be noted that these descriptions are not intended to limit the present disclosure. On the contrary, the present disclosure covers modifications and equivalent arrangements obvious to those skilled in the art. Therefore, the scope of the claims must be interpreted in the broadest manner to comprise all obvious modifications and equivalent arrangements.

What is claimed is:

1. A dual-frequency antenna, comprising:

a dielectric carrier plate comprising a first surface;

a first radiator disposed on the first surface;

a second radiator disposed on the first surface;

a coupling radiator disposed on the first surface and located between the first radiator and the second radiator, wherein the coupling radiator is spaced apart from the first radiator and the second radiator respectively on the first surface; and a coaxial cable comprising an inner conductor, a first insulating layer, an outer conductor and a second insulating layer, wherein the first insulating layer covers a part of a surface of the inner conductor to make one end of the inner conductor exposed, and the inner conductor, which is exposed, is electrically connected to the first radiator; the outer conductor covers a part of a surface of the first insulating layer; the second insulating layer covers a part of a surface of the outer conductor to make a portion of the outer conductor exposed, and the outer conductor, which is exposed, is electrically connected to the second radiator;

wherein the inner conductor is electrically connected to the first radiator, and the outer conductor is electrically connected to the second radiator, so that the first radiator and the second radiator generate a first resonance mode; the coupling radiator is coupled with the first radiator and the second radiator respectively to generate a second resonance mode; and a center frequency of the second resonance mode is greater than a center frequency of the first resonance mode.

2. The dual-frequency antenna according to claim 1, wherein the dielectric carrier plate is a single-sided board.

3. The dual-frequency antenna according to claim 1, wherein the second radiator comprises an extension section extending toward the first radiator, the coupling radiator comprises a first sub-radiator and a second sub-radiator; the extension section, the first sub-radiator and the second sub-radiator are disposed on the first surface; the extension section is disposed between the first sub-radiator and the second sub-radiator; the extension section is spaced apart from the first sub-radiator and the second sub-radiator respectively, and the extension section is electrically connected to the external conductor, which is exposed.

4. The dual-frequency antenna according to claim 3, wherein the extension section and the first radiator are spaced apart from each other on the first surface, and the outer conductor, which is exposed, is adjacent to the first insulating layer, which is exposed.

5. The dual-frequency antenna according to claim 3, wherein a shape of the extension section is a triangle, a rectangle or any geometric figure.

6. The dual-frequency antenna according to claim 1, wherein the coupling radiator, the first radiator and the second radiator are planar structures or three-dimensional structures respectively.

7. The dual-frequency antenna according to claim 1, wherein the center frequency of the first resonance mode is adjusted by a length between an end of the first radiator away from the coupling radiator and an end of the second radiator away from the coupling radiator on the first surface.

8. The dual-frequency antenna according to claim 1, wherein the first resonance mode is a half-wavelength resonance mode.

9. The dual-frequency antenna according to claim 1, wherein the central frequency of the second resonance mode is adjusted by a size of a first gap between the coupling radiator and the first radiator on the first surface and a size of a second gap between the coupling radiator and the second radiator on the first surface.

10. The dual-frequency antenna according to claim 1, wherein a size of a first gap between the coupling radiator and the first radiator on the first surface is equal to a size of a second gap between the coupling radiator and the second radiator on the first surface.

11. The dual-frequency antenna according to claim 10, wherein the larger the first gap between the coupling radiator and the first radiator on the first surface, the larger the central frequency of the second resonance mode.

12. The dual-frequency antenna according to claim 1, wherein an electrical connection between the inner conductor and the first radiator and an electrical connection between the outer conductor and the second radiator are arranged at intervals along an extending direction of the coaxial cable.

* * * * *